US006039388A

United States Patent [19]

Choi

[11] Patent Number: 6,039,388

[45] Date of Patent: Mar. 21, 2000

[54] HOOD OVERSLAM BUMPER FOR AUTOMOBILES

[75] Inventor: Guk-Sun Choi, Kyunggi-do, Rep. of Korea

[73] Assignee: Hyundai Motor Company, Seoul, Rep. of Korea

[21] Appl. No.: 08/951,408

[22] Filed: Oct. 16, 1997

[30] Foreign Application Priority Data

Oct. 18, 1996 [KR] Rep. of Korea .................... 96-46922

[51] Int. Cl.[7] .................................................. B60J 5/02

[52] U.S. Cl. ...................... 296/207; 16/86 R; 180/69.23; 267/152; 267/153

[58] Field of Search .................... 296/76, 207; 16/86 R, 16/86 A; 180/69.21, 69.22, 69.23; 267/140.4, 152, 153

[56] References Cited

U.S. PATENT DOCUMENTS

| | | | |
|---|---|---|---|
| 3,118,659 | 1/1964 | Paulsen | 267/35 |
| 3,323,786 | 6/1967 | Boschi | 267/63 |
| 3,874,646 | 4/1975 | Vernier | 267/136 |
| 3,883,101 | 5/1975 | Vernier | 248/9 |
| 3,947,007 | 3/1976 | Pelat | 267/136 |
| 4,005,858 | 2/1977 | Lochner | 267/136 |
| 4,032,269 | 6/1977 | Sheth | 418/266 |
| 5,682,667 | 11/1997 | Flagg | 29/460 |
| 5,806,908 | 9/1998 | Kim | 296/36 |

FOREIGN PATENT DOCUMENTS

| | | | |
|---|---|---|---|
| 2478718 | 9/1981 | France | 296/207 |

*Primary Examiner*—D. Glenn Daydan
*Assistant Examiner*—Paul Chenevert
*Attorney, Agent, or Firm*—Christie, Parker & Hale, LLP

[57] ABSTRACT

A hood overslam bumper for automobiles has an elastic member, which is mounted to a hood inner panel, and a spring-biased hollow cushion member which is mounted to the upper member of a chassis. The spring of the cushion member is selected from a compression coil spring, a pneumatic spring and a hydraulic spring. When a hood is slammed down, the hood is made to slowly close with the elastic member gradually compressing the spring-biased top wall of the hollow cushion member. Therefore, the hood overslam bumper of this invention effectively absorbs and reduces the slamming impact noises and vibrations occurring in the slamming of a hood, thus allowing a car to be almost completely free from such noises and vibrations.

6 Claims, 2 Drawing Sheets

HOOD OVERSLAM BUMPER FOR AUTOMOBILES

FIELD OF THE INVENTION

The present invention relates, in general, to an impact absorber system for automobiles and, more particularly, to a hood overslam bumper for automobiles capable of absorbing and reducing the slamming impact noises and vibrations occurring in the slamming of a hood, thus allowing a car to be almost completely free from such noises and vibrations.

BACKGROUND OF THE INVENTION

FIGS. 1 and 2 show the position and construction of a conventional hood overslam bumper for automobiles. As shown in the drawings, the conventional hood overslam bumper 1 is installed on each side of the top of an upper member 2 of a chassis, thus preventing a hood 3 from coming into direct contact with the upper member 2 when the hood 3 is slammed down. That is, the hood overslam bumpers 1 for automobiles absorb and reduce the impact noises and vibrations when the hood 3 is slammed down. In the prior art, such an overslam bumper 1, which is an impact absorbing member, is typically made of a known impact absorbing material such as rubber.

Such a conventional overslam bumper 1 absorbs the impact noises and vibrations, caused by the hood 3, only due to the impact absorbing properties of its material. Therefore, the overslam bumper 1 is problematic in that it has an inferior impact absorbing effect and so it fails to effectively reduce such noises and vibrations occurring in the slamming of the hood 3. Another problem of the above overslam bumper 1 resides in that the bumper 1 is consumed with the passage of time, thus losing its expected impact absorbing properties and failing to reduce such noises and vibrations.

SUMMARY OF THE INVENTION

Accordingly, the present invention has been made keeping in mind the above problems occurring in the prior art, and an object of the present invention is to provide a hood overslam bumper for automobiles which is capable of effectively absorbing and reducing the slamming impact noises and vibrations in the closing of a hood, thus allowing a car to be almost completely free from such noises and vibrations.

In order to accomplish the above object, the present invention provides a hood overslam bumper for automobiles, comprising: an elastic member mounted to the lower surface of a hood inner panel; a compressible cushion member mounted to the top surface of an upper member of a chassis at a position corresponding to the elastic member, thus being brought into elastic contact with the elastic member when a hood is slammed down, the cushion member being hollowed, thus having a cavity; a rod interiorly set in the top center of the hollow cushion member and vertically extending downward within the cavity of the cushion member; a cup-shaped housing set in the hollow cushion member, thus defining the lower portion of the cavity and structurally supporting the cushion member; and a biasing member positioned in the cavity of the cushion member, with the top and bottom ends of the biasing member being stopped by the rod and the housing respectively, thus normally biasing the top wall of the cushion member upwardly.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
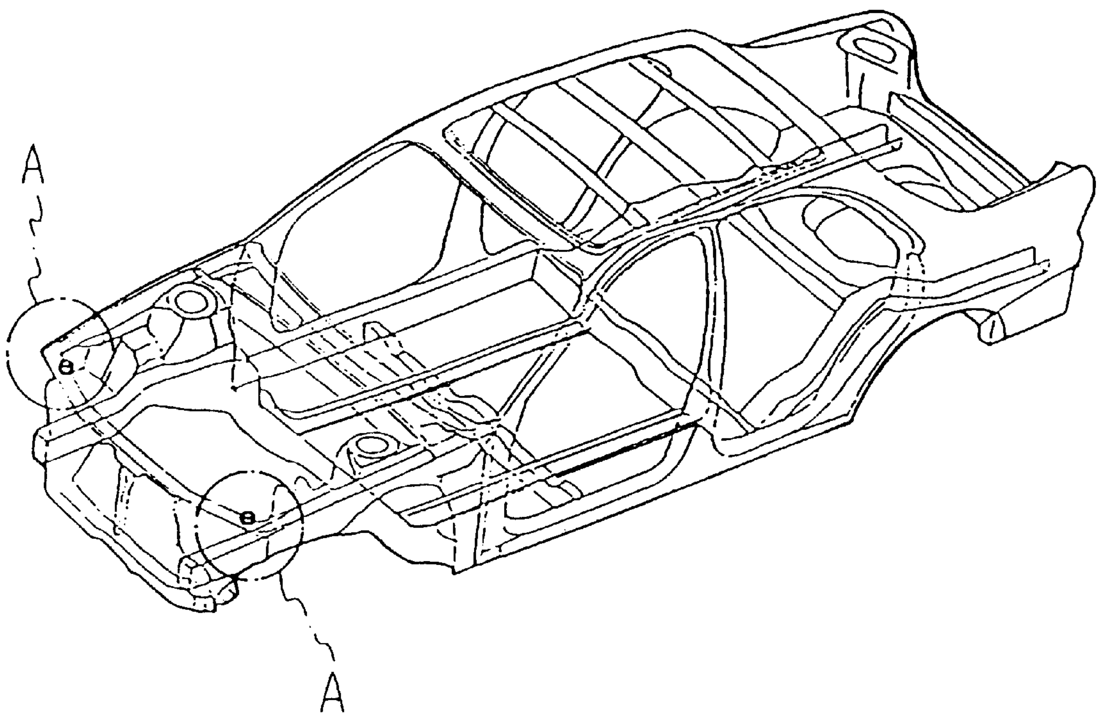
FIG. 1 PRIOR ART
FIG. 1 is a perspective view of a prior art car chassis, with two hood overslam bumpers being positioned on opposite sides of the top of an upper member of the chassis.
Figure 2:
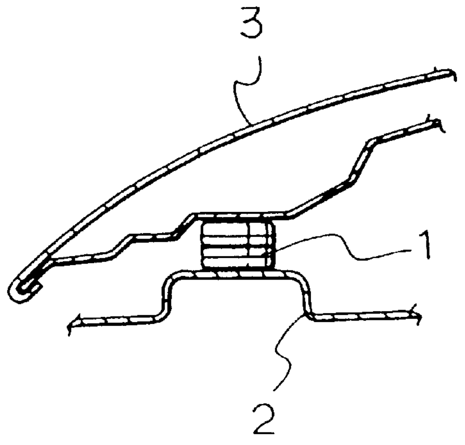
FIG. 2 PRIOR ART
FIG. 2 is a sectional view of the A part of FIG. 1, showing the construction of a conventional hood overslam bumper for automobiles.
Figure 3:
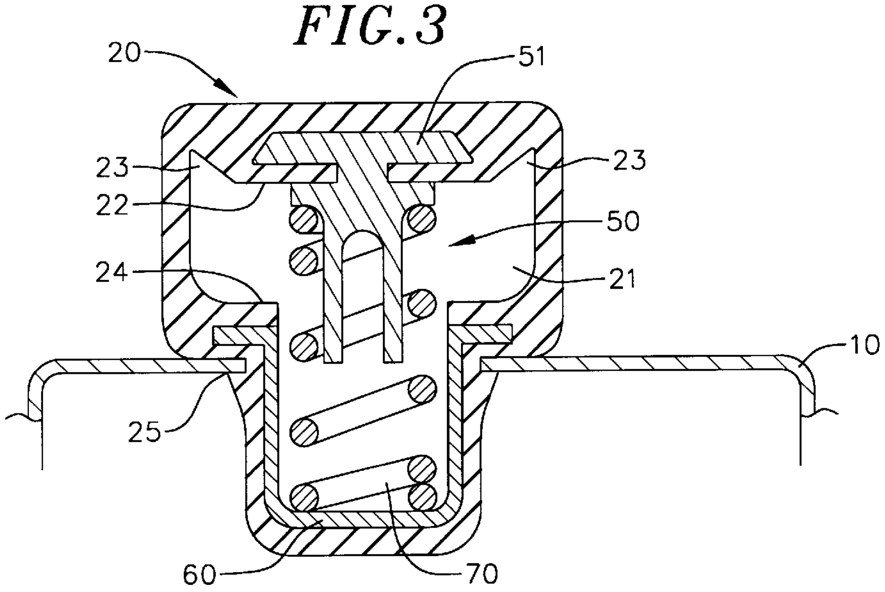
FIG. 3 is a sectional view showing the construction of a hood overslam bumper for automobiles in accordance with the preferred embodiment of the present invention.
Figure 4:
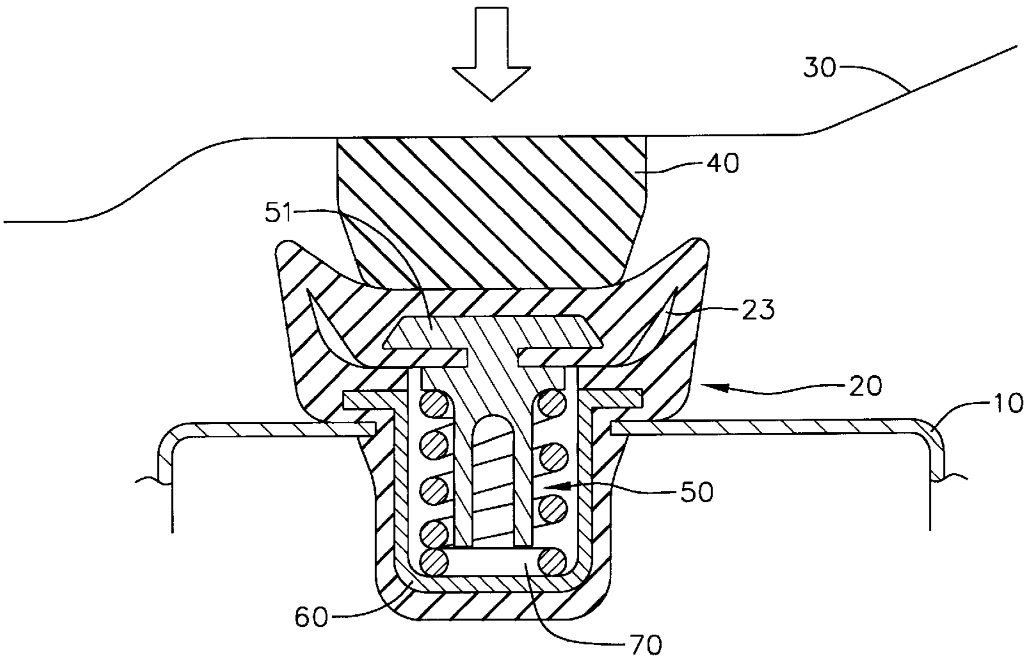
FIG. 4 is a sectional view showing the operation of the hood overslam bumper of this invention.

FIG. 3 is a sectional view showing the construction of a hood overslam bumper for automobiles in accordance with the preferred embodiment of this invention. FIG. 4 is a sectional view showing the operation of the hood overslam bumper of this invention. As shown in the drawings, the hood overslam bumper of this invention includes an elastic member 40, which is mounted on each side of the bottom of a hood inner panel 30 of a chassis. A compressible cushion member 20, having a cavity 21, is installed on each side of the top of an upper member 10 of the chassis at a position corresponding to the elastic member 40, thus being brought into elastic contact with the elastic member 40 when a hood is slammed down. A rod 50 is interiorly set in the top center of the hollow cushion member 20 and vertically extends downward to a length in the cavity 21. A cup-shaped housing 60 is concentrically set in the lower portion of the cushion member 20, thus defining the lower portion of the cavity 21 and structurally supporting the cushion member 20. A biasing member 70 is positioned in the cavity 21, with the top and bottom ends of the biasing member 70 being stopped by the rod 50 and the housing 60, thus normally biasing the top wall of the cushion member 20 upwardly.

The cushion member 20 is preferably formed of an elastic material such as rubber into a single body. A fitting groove 25 is formed on the outside surface of the cushion member 20 at the middle portion of the member 20, thus allowing the member 20 to be mounted to the upper member 10 through a fitting process.

The inner top surface 22 of the hollow cushion member 20 is sloped upward at its outside edge, thus forming a groove 23 at that edge. When the hood is slammed down, the elastic member 40 of the hood inner panel 30 comes into contact with and compresses the spring-biased top wall of the hollow cushion member 20 and so the slamming impact is absorbed and reduced by the cushion member 20. In such a case, the above groove 23 allows the spring-biased top wall of the cushion member 20 with the rod 50 to be uniformly collapsed and allows the inner top surface 22 to come into uniform contact with the inner bottom surface 24 of the cushion member 20. That is, the groove 23 effectively prevents the cushion member 20 from being unevenly collapsed during the impact absorbing operation of the hood overslam bumper of this invention.

The rod 50 has an enlarged-diameter head 51 at its top end. The head 51 of the rod 50 is firmly implanted in the top wall of the hollow cushion member 20, thus stably holding the rod 50 in the cushion member 20.

In the preferred embodiment, a compression coil spring is used as the biasing member 70 as shown in the drawings.

However, it should be understood that the biasing member 70 may be selected from pneumatic springs, hydraulic springs and the like in place of the compression coil spring when such a spring effectively and elastically biases the rod 50 upwardly.

The operational effect of the above hood overslam bumper will be described hereinbelow.

When the hood is slammed down as shown in FIG. 4, the elastic member 40 of the hood inner panel 30 comes into contact with and compresses the spring-biased top wall of the hollow cushion member 20 and so the cushion member 20 primarily absorbs the slamming impact with the top wall of the member 20 being lowered. In such a case, the rod 50 is lowered with the top wall of the cushion member 20, thus compressing the biasing member 70 while secondarily absorbing the slamming impact. Therefore, it is possible to prevent a quick lowering of the elastic member 40 and to reduce the slamming impact. The slamming impact is further reduced when the inner top surface 22 of the cushion member 20 is brought into contact with the inner bottom surface 24.

When the hood is opened, the elastic member 40 is removed from the top wall of the cushion member 20 and so the cushion member 20 elastically returns to its original configuration due to the restoring force of the biasing member 70 as shown in FIG. 3.

As described above, the present invention provides a hood overslam bumper for automobiles. The hood overslam bumper of this invention is comprised of an elastic member, which is mounted to a hood inner panel, and a spring-biased hollow cushion member which is mounted to the upper member of a chassis. When a hood is slammed down, the hood is made to slowly close with the elastic member gradually compressing the spring-biased top wall of the hollow cushion member. Therefore, the hood overslam bumper of this invention effectively absorbs and reduces the slamming impact noises and vibrations occurring in the slamming of a hood, thus allowing a car to be almost completely free from such noises and vibrations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. The combination of a hood overslam bumper, a chassis and a hood of an automobile, comprising:

a first bumper member mounted to a lower surface of the hood and having elasticity; and a second bumper member which comprises a compressible cushion member mounted to a top surface of an upper member of the chassis at a position corresponding to said first bumper member, thus being brought into elastic contact with the first bumper member when the hood is slammed down, said cushion member being hollow, thus having a cavity; a rod interiorly set in a top center of said hollow cushion member and vertically extending downward within said cavity of the cushion member; a cup-shaped housing set in said hollow cushion member, thus defining a lower portion of the cavity and structurally supporting the cushion member; and a biasing member positioned in said cavity of the cushion member and being stopped by the rod and the housing, thus normally biasing a top wall of said cushion member upwardly.

2. The combination according to claim 1, wherein an inner top surface of said hollow cushion member is sloped upward at its outside edge, thus forming a groove at said edge, said groove allowing the top wall of the cushion member with the rod to be uniformly collapsed and allowing the inner top surface of the cushion member to come into uniform contact with an inner bottom surface of the cushion member when the hood is slammed down.

3. The combination according to claim 1, wherein said biasing member is a compression coil spring.

4. A bumper for an automobile, comprising:

a compressible, hollow cushion member with a cavity;

a rod interiorly set in a top center of said compressible, hollow cushion member and vertically extending downward within said cavity of the cushion member;

a cup-shaped housing set in said hollow cushion member, structurally supporting the cushion member; and a biasing member positioned in said cavity of the cushion member and being stopped by the rod and the housing, thus normally biasing a top wall of said cushion member upwardly.

5. The bumper according to claim 4, wherein an inner top surface of said hollow cushion member is sloped upward at its outside edge, thus forming a groove at said edge, said groove allowing the top wall of the cushion member with the rod to be uniformly collapsed and allowing the inner top surface of the cushion member to come into uniform contact with the inner bottom surface of the cushion member.

6. The bumper according to claim 4, wherein said biasing member is a compression coil spring.

* * * * *